US010592289B2

(12) United States Patent
Dinca et al.

(10) Patent No.: US 10,592,289 B2
(45) Date of Patent: Mar. 17, 2020

(54) PROVIDING AUXILIARY SERVICES OR FUNCTIONALITY ON AN APPARATUS

(71) Applicant: Hewlett-Packard Development Company, L.P., Houston, TX (US)

(72) Inventors: Laurian Dinca, Eagle, ID (US); Stephen H Schwartz, Boise, ID (US); Perry V Lea, Eagle, ID (US); Mark J Wibbels, Boise, ID (US); Jon T Huber, Boise, ID (US); Roger S Twede, Meridian, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 317 days.

(21) Appl. No.: 15/521,796

(22) PCT Filed: Oct. 31, 2014

(86) PCT No.: PCT/US2014/063561
§ 371 (c)(1),
(2) Date: Apr. 25, 2017

(87) PCT Pub. No.: WO2016/069023
PCT Pub. Date: May 6, 2016

(65) Prior Publication Data
US 2017/0249190 A1 Aug. 31, 2017

(51) Int. Cl.
*H04L 12/00* (2006.01)
*G06F 9/50* (2006.01)
(Continued)

(52) U.S. Cl.
CPC .......... *G06F 9/5022* (2013.01); *G06F 3/1203* (2013.01); *G06F 3/1206* (2013.01);
(Continued)

(58) Field of Classification Search
CPC ........ G06F 3/1203; G06F 3/1239; G06F 9/50; G06F 3/1206; G06F 9/5022;
(Continued)

(56) References Cited

U.S. PATENT DOCUMENTS

| 4,829,326 A | 5/1989 | Emmett et al. |
| 5,049,898 A | 9/1991 | Arthur et al. |

(Continued)

FOREIGN PATENT DOCUMENTS

| DE | 3752138 T2 | 10/1994 |
| DE | 10042914 | 4/2001 |

(Continued)

OTHER PUBLICATIONS

"HP Rewards" May 31, 2013. HP Support Forums http://h30434.www3.hp.com/~3 pages.
(Continued)

*Primary Examiner* — Frantz Coby
(74) *Attorney, Agent, or Firm* — HP Inc. Patent Department

(57) ABSTRACT

An apparatus operates to provide default services or functionality. The apparatus authenticates replaceable resources by determining whether the replaceable resources originate from a desired source. The apparatus provides an auxiliary service or functionality in addition to the default services or functionality when each of the replaceable resources originates from the desired source, and precludes the auxiliary service or functionality when any of the replaceable resources do not originate from the desired source.

13 Claims, 5 Drawing Sheets

(51) Int. Cl.
*G06Q 20/22* (2012.01)
*G06F 3/12* (2006.01)
*H04L 29/08* (2006.01)
*H04L 29/06* (2006.01)

(52) U.S. Cl.
CPC ........... *G06F 3/1239* (2013.01); *G06Q 20/22* (2013.01); *H04L 29/0809* (2013.01); *H04L 63/0876* (2013.01); *H04L 67/02* (2013.01); *G06F 2221/2129* (2013.01); *H04L 29/08081* (2013.01); *H04L 63/102* (2013.01); *H04L 67/00* (2013.01)

(58) Field of Classification Search
CPC . G06F 2221/2129; G06Q 20/22; H04L 67/02; H04L 29/08081; H04L 29/0809; H04L 63/0876; H04L 63/102; H04L 67/00
USPC ........................................ 709/229, 228, 230
See application file for complete search history.

(56) References Cited

U.S. PATENT DOCUMENTS

| | | | |
|---|---|---|---|
| 5,568,491 A * | 10/1996 | Beal | G05B 13/028 714/26 |
| 5,835,817 A | 11/1998 | Bullock et al. | |
| 5,837,986 A | 11/1998 | Barile et al. | |
| 5,930,553 A | 7/1999 | Hirst et al. | |
| 6,008,827 A | 12/1999 | Fotland | |
| 6,165,664 A | 12/2000 | Cook | |
| 6,351,317 B1 | 2/2002 | Sasaki et al. | |
| 6,467,888 B2 | 10/2002 | Wheeler et al. | |
| 6,522,348 B1 | 2/2003 | Brot et al. | |
| 6,850,900 B1 * | 2/2005 | Hare | G06Q 30/0625 705/26.62 |
| 6,976,090 B2 * | 12/2005 | Ben-Shaul | H04L 29/12066 709/246 |
| 7,221,473 B2 | 5/2007 | Jeran et al. | |
| 7,248,693 B1 | 7/2007 | Tretter et al. | |
| 7,356,279 B2 | 4/2008 | Miller | |
| 7,365,874 B2 * | 4/2008 | Lapstun | B41J 2/0452 347/6 |
| 7,412,236 B1 * | 8/2008 | Blight | H04W 48/16 455/426.1 |
| 7,444,192 B2 * | 10/2008 | Dickinson | B60L 3/12 700/83 |
| 7,551,859 B2 | 6/2009 | Miller et al. | |
| 7,987,112 B2 * | 7/2011 | Jones | G03G 21/02 705/14.1 |
| 7,991,665 B2 * | 8/2011 | Hafner | B60L 3/0046 705/35 |
| 8,211,419 B2 * | 7/2012 | Siljander | A01M 1/026 424/84 |
| 8,359,640 B2 * | 1/2013 | Hashimoto | G06F 21/35 358/1.15 |
| 8,532,506 B2 * | 9/2013 | Jones | G03G 15/0863 399/12 |
| 9,076,015 B2 * | 7/2015 | Maim | G06F 17/2229 |
| 9,141,816 B2 * | 9/2015 | Refstrup | B41J 2/17546 |
| 9,619,663 B2 * | 4/2017 | Refstrup | B41J 2/17546 |
| 2002/0087522 A1 * | 7/2002 | MacGregor | G06Q 30/02 |
| 2002/0194064 A1 | 12/2002 | Parry et al. | |
| 2003/0053815 A1 | 3/2003 | Testardi et al. | |
| 2003/0055876 A1 | 3/2003 | Korala et al. | |
| 2003/0139996 A1 * | 7/2003 | D'Antoni | G06Q 10/087 705/37 |
| 2005/0149410 A1 * | 7/2005 | Livesay | G06Q 10/06 705/26.8 |
| 2006/0047576 A1 * | 3/2006 | Aaltonen | G06Q 30/06 705/26.43 |
| 2006/0072145 A1 | 4/2006 | Simpson | |
| 2006/0087678 A1 * | 4/2006 | Simpson | G06F 21/34 358/1.15 |
| 2006/0120735 A1 | 6/2006 | Adkins et al. | |
| 2007/0146771 A1 * | 6/2007 | Silverbrook | B41J 2/0452 358/1.14 |
| 2009/0040554 A1 | 2/2009 | Burke et al. | |
| 2009/0177558 A1 * | 7/2009 | Showghi | G06Q 30/06 705/26.1 |
| 2010/0073707 A1 | 3/2010 | Ferlitsch | |
| 2010/0123911 A1 | 5/2010 | Guay | |
| 2010/0179857 A1 * | 7/2010 | Kalaboukis | G06Q 20/203 705/7.31 |
| 2011/0085196 A1 | 4/2011 | Liu et al. | |
| 2011/0128567 A1 * | 6/2011 | Cachia | B41J 2/17546 358/1.14 |
| 2011/0188068 A1 | 8/2011 | Jones et al. | |
| 2012/0114324 A1 * | 5/2012 | Volkert | F16M 11/041 396/428 |
| 2012/0218597 A1 | 8/2012 | Hashimoto | |
| 2013/0286428 A1 | 10/2013 | Oleinik et al. | |
| 2013/0346153 A1 * | 12/2013 | Kraus | G06Q 30/0623 705/7.31 |
| 2014/0096782 A1 | 4/2014 | Ampolini et al. | |

FOREIGN PATENT DOCUMENTS

| | | |
|---|---|---|
| DE | 10042914 A1 | 4/2001 |
| EP | 1070594 | 1/2001 |
| JP | 05193127 | 8/1993 |
| JP | 09169123 | 6/1997 |
| JP | 2000-215168 A | 8/2000 |
| JP | 2000270129 | 9/2000 |
| JP | 2003-039767 A | 2/2003 |
| JP | 2004-086336 A | 3/2004 |
| JP | 2004-133906 A | 4/2004 |
| KR | 20110127566 A | 11/2011 |
| WO | WO-8801818 | 3/1988 |
| WO | WO-9728001 | 8/1997 |
| WO | WO-2000019278 | 4/2000 |
| WO | WO-2001061917 | 8/2001 |
| WO | WO-2013022443 A1 | 2/2013 |
| WO | WO-2013055343 | 4/2013 |
| WO | WO-2013/062528 | 5/2013 |

OTHER PUBLICATIONS

HP "Rewards" Frequently asked questions, Jul. 15, 2015. http://web.archive.org/~3 pages.
LexMark; "Lexmark's Cloud-Based Print Release Solution Enables Mobile Printing from Anywhere"; Aug. 11, 2011; 2 pages.
Security Features of Lexmark Multi-function and Single Function Printers, (White Paper). Nov. 2013, http://www.lexmark.com/~51 pages.
Wikipedia, "Netflix," Mar. 30, 2012, <http://en.wikipedia.org/~29 pages.
Wikipedia, "Subscription business model," Mar. 21, 2012, <http://en.wikipedia.org/~5 pages.
www.papercut.com/tour/; "A quick look at PaperCut"; 6 pages~2012.

* cited by examiner

PROVIDING AUXILIARY SERVICES OR FUNCTIONALITY ON AN APPARATUS

BACKGROUND

Numerous kinds of printers exist. For example, network-capable printers exist for connecting to external networks. Services for users may be provided on printers.

DETAILED DESCRIPTION

Figure 1:
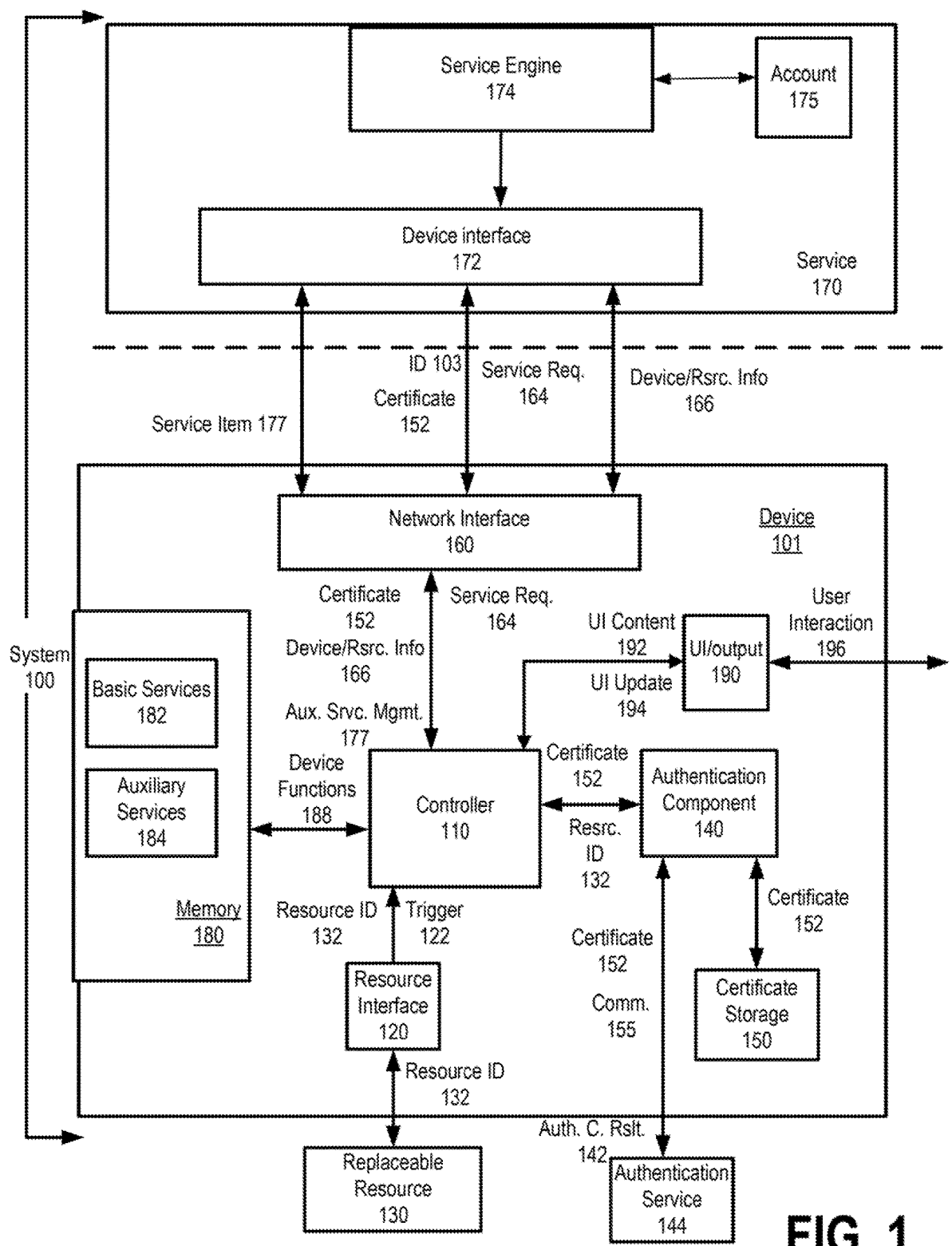
FIG. 1 illustrates an example system for selectively enhancing a service or functionality provided on an electronic device.

Examples described herein provide for a computing device can provide an auxiliary service or functionality when it is used with a replaceable resource that originates from a desired source.

Among other advantages, examples such as described enable a manufacturer or provider of an electronic device to incentivize a user to purchase or otherwise acquire replaceable resources of an electronic device from a desired source. By incentivizing users, the manufacturer or provider can exert some control or influence in order to promote replacement resources from the desired source (e.g., from the manufacturer).

One or more examples describe an apparatus comprises a memory resource, controller, and a resource utilization component to manage use of a set of replaceable resources. The controller is to perform operations to determine whether each replaceable resource in a set of replaceable resources originates from a desired source, and provide an auxiliary service or functionality on the apparatus for when the replaceable resource in the set originates from the desired source, and preclude use of the auxiliary service or functionality when the replaceable resource in the set is not determined to originate from the desired source.

Examples provide for an apparatus that operates, by default, at an operational level that excludes any service or functionality other than a default set of services or functionality. The device determines whether each replaceable resource in a set of replaceable resources originates from a desired source. The apparatus further operates to, in response to determining that each replaceable resource in the set of replaceable resources originates from the desired source, provide at least a first auxiliary resource or functionality to the apparatus so as to change the operational level of the apparatus from the default operational level to an enhanced operational level.

In examples described herein, a non-transitory computer readable medium stores instructions, that when executed by one or more processors, cause the one or more processors to perform a method including determining an authentication status for a set of replaceable resources of the computing device, the authentication status indicating whether each replaceable resource in the set of replaceable resources originates from a desired source, and determining a set of services or functionality to provide to the computing device based on the authentication status of each replaceable resource in the set of replaceable resources, the set of services or functionality being in addition to a default set of services or functionality for enabling a functional operational level on the apparatus.

In further examples, a printer includes logical and physical elements to contact an external server for authentication of a resource (e.g., an ink resource). The external server provides verification services for the resource, to support the printer in enabling or deactivating additional services or resources associated with the printer.

Implementations provide for the use of embedded components on a device to perform an authentication process which, when completed, activates auxiliary services on the device. The authentication process verifies that the origin of a consumable resource is within a set of permitted origins and securely stores a certificate confirming this verification. An external service verifies the certificate and proceeds to unlock receive, activate or otherwise provide access to the auxiliary services.

In further illustration, a set of resources are defined in association with additional content to be provided with a device. The device includes hardware and machine readable instructions (e.g., software) for connecting to resources within the set of resources, determining and verifying a source of the connected resource, and employing or inhibiting the additional content on determining the source.

In some examples, a replaceable resource includes resources which are consumed, meaning resources that are depleted over time and use. By way of example, an ink resource, such as an ink cartridge, is an example of a resource that is consumed by a printer, the ink or the cartridge being replaceable to avoid complete depletion. In other examples, a replaceable resource is a modular component, such as provided by a connected accessory input device or insertable memory resource.

In examples described herein, "auxiliary services" refer to services provided to a user which are distinct from "default services." In examples, "default services" (also referred to as "basic services") of a device refer to services provided with the device that are made available to fulfill a default or core functionality associated with fulfilling the intended use or primary function of the device. In examples of default services, the default services of a device are made available to a user without utilizing a process (e.g., authentication process) which controls access to the services. For example, a printer may include printing services that are made available immediately after the printer is installed. The printing services enable a user to operate the printer to print documents. In another example of how default services are provided, a multifunction printer provides default services such as fax services, copier services and printing services.

In contrast, "auxiliary services" (also referred to as "enhanced services") for a device as described herein refer to services that are enabled (e.g., made available to a user) or precluded (e.g., made unavailable to a user). In examples of auxiliary services, an auxiliary service of a device is made available to a user by utilizing a process (e.g., authentication process) which controls access, to the services. Examples of auxiliary services provided include 1) new services on the device (e.g., printing services; gaming services; device control services), 2) network services (e.g., e-mail, messaging, Internet functions), 3) modification of existing services (e.g., modifying how a default printing function works) or 4) premium services (e.g., services which are made available after payment is rendered to another party). For example, a printer may be capable of printing a special graphical effect under a graphical printing service, but the graphical printing service is only available as a premium service (e.g., a user must pay or otherwise satisfy another condition to obtain the service). In another example, a printer may provide an e-mail service to access a user's e-mail, and the printer switches between providing the e-mail service and ceasing the e-mail service.

In examples, access to "auxiliary services" of a device is controlled under different modes. For example, a device may operate in a default mode in which only the default services are available, and an auxiliary mode in which both auxiliary services and the default services are available. In another example, a device includes features which are enabled while a certain condition is true (e.g., a particular kind of replaceable resource is connected).

Examples described herein provide that methods, techniques, and actions performed by a computing device are performed programmatically, or as a computer-implemented method. Examples may be implemented as hardware, or a combination of hardware (e.g., a processor(s)) and executable instructions (e.g., stored on a machine-readable storage medium). These instructions can be stored in one or more memory resources of the computing device. A programmatically performed step may or may not be automatic.

Examples described herein can be implemented using modules or components, which may be any combination of hardware and programming to implement the functionalities of the modules or components. In examples described herein, such combinations of hardware and programming may be implemented in a number of different ways. For example, the programming for the components may be processor executable instructions stored on at least one non-transitory machine-readable storage medium and the hardware for the components may include at least one processing resource to execute those instructions. In such examples, the at least one machine-readable storage medium may store instructions that, when executed by the at least one processing resource, implement the modules or components. In examples, a system may include the machine-readable storage medium storing the instructions and the processing resource to execute the instructions, or the machine-readable storage medium may be separate but accessible to system 200 and the processing resource.

Some examples described herein can generally involve the use of computing devices, including processing and memory resources. For example, examples described herein may be implemented, in whole or in part, on computing devices such as desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1 illustrates an example system for selectively enhancing a service or functionality provided on an electronic device. In examples of FIG. 1, a system 100 includes a network enabled device, such as a printer, and network services that can selectively enhance a service or functionality provided on the device. Furthermore, a system of FIG. 1 can make a determination to enhance a service or functionality to the network-enabled device based on information determined about a source of a replaceable resource that is utilized on the device. In examples of FIG. 1, the network enabled device is a printer (e.g., home printer), capable of receiving network services, including subscriptions for content and resources. The replaceable resource can include an ink supply of the printer. In variations, examples described herein can extend to other forms of computing devices, such as a home computer (e.g., laptop, desktop computer, etc.) in which the replaceable resource is an accessory or memory card.

Functions described in relation to the examples herein may be implemented by devices via hardware or a combination of hardware and instructions for the hardware. For example, components of FIG. 1 may be implemented via hardware which is instructed to perform functionality associated with the components utilizing instructions stored in memory.

Accordingly, a system such as illustrated as in FIG. 1 can operate to selectively provide a specific service or functionality (associated with a corresponding network enabled device (e.g., printer)) in response to a determination as to an origin or source of a consumable resource (e.g., ink supply).

Examples of FIG. 1 recognizes that numerous kinds of network services may be provided for and by electronic, devices. For example, among other possible types of services, a printer may be to print documents received through a network service or communication, provide print job information on a display, convey status information about the printer to an external service, receive content subscriptions (e.g., newsletters) or resource subscriptions (e.g., ink subscription). Moreover, examples as in FIG. 1 recognize that the services provided by an individual device may be implemented as part of an overall business service, such as a cloud printing service. Such kinds of devices involve resupply of resources such as ink, and examples described herein recognize that incentives, such as the availability of a desirable service or functionality for the device can promote user activity to purchase the consumable resources from a desired source or origin.

In FIG. 1, a system 100 includes a network enabled device 101 and network services 170. The device 101 includes a controller 110, a resource interface 120, an authentication component 140 and a memory 180. In some variations, the device 101 can also include a network interface 160 and an output device 190 (e.g., display) on which a user interface can be provided or otherwise enabled. The device 101 can operate in a default or basic mode using instructions for basic services 182, shown as being stored in memory 180. The instructions for basic services 182 are retrieved and executed by controller 110 to provide default or core functionality associated with fulfilling the intended use or primary function of the device. For example, if the device is a printer, the instructions for basic services 182 may include instructions for a default printing package (e.g., printing basic graphical designs), but exclude instructions for enabling advanced graphics or special effects.

In one implementation, device 101 is a printer provided as part of an electronic cloud printing service. The printer detects a connected resource, authenticates the resource, accesses the cloud printing service, and receives permission from the cloud printing service to provide auxiliary services to the user.

The resource interface 120 can include mechanical and electrical components for functionally receiving replaceable resources 130, such as an ink cartridge (or set of multiple resources) or a memory card. In one implementation, the resource interface 120 also includes logic, such as provided through integrated circuitry, to extract a resource identifier (ID) 132 from the replaceable resource.

In an implementation, resource ID 132 is linked to or associated with an origin of the consumable resource, such as the identity of the manufacturer of the consumable resource. In another implementation the information identifies whether the ink cartridge is an Original Equipment Manufacturer (OEM) authentic cartridge.

In one implementation, the resource identifier 132 includes a product or manufacturing identifier, such as a serial number. The resource identifier 132 can be printed or otherwise provided with the replaceable resource, and the resource interface can, for example, include an optical scanner or other sensor interface to detect the identifier. In a variation, the resource identifier 132 can be stored as data on a storage medium of the replaceable resource 130. For example, the replaceable resource can include a printed tag that embeds a serial number. Still further, the replaceable resource can include memory to store the serial or product identifier in encrypted or non-encrypted form. Examples of resource ID 132 include serial numbers, manufacturer numbers, codes, or non-confidential information which is associated with a product.

The controller 110 includes logic for controlling operation of the resource interface 120. The controller 110 can be implemented as hardware, or hardware utilizing machine readable instructions (e.g., firmware or software). In one implementation, the controller 110 is implemented as a processor that communicates with and controls the resource interface 120. In one implementation, the resource interface 120 signals a trigger 122 upon detecting a resource event, corresponding to when the replaceable resource 130 is functionally connected to the device 101. The trigger 122 can cause the controller 110 to communicate with the resource interface 120 to obtain the resource identifier 132. In examples of FIG. 1, the replaceable resource 130 can be representative of a set of multiple resources, each of which can be replaced and utilized in a manner described with exampled provided herein.

The trigger 122 can coincide with any of (i) an out-of-box event, when the device 101 is first powered and made operational, (ii) a powered on event, when the device 101 is powered into an active or operational state from a low or off power state, and/or (iii) a replacement event, when the replaceable resource (or individual resource in set of resources) is replaced (when a consumable resource such as ink is depleted and then replaced). Still further, in some examples, the trigger 122 can be generated repeatedly, meaning the resource events can be programmatically generates status or health checks, or alternatively polling events. Resource interface 120 operates to detect and respond to trigger 122.

Examples of replaceable resource 130 include ink supplies (e.g., ink cartridges), toner cartridges, paper, electronic storage tape, or other materials which may be consumed during the primary operation of the device. In an example in which device 101 is a printer and replaceable resource 130 is an ink cartridge, controller 110 may implement resource interface 120 in conjunction with a print head coupled to the ink cartridge. The ink cartridge includes a scannable bar code on a housing. The print head includes elements for scanning the bar code. When scanned, resource interface 120 obtains resource ID 132.

In implementations, resource interface 120 may also acquire other information about the consumable resource besides resource ID 132. This information may be provided to controller 110 for later use as part of device/resource information 166.

Trigger 122 signals controller 110 to begin processes for controlling access to additional functionality or services. Resource ID 132 is used in these processes to determine whether the additional functionality or services are provided.

In implementations, it is possible that resource ID 132 erroneously identifies the replaceable resource 130. In examples, access to additional functionality on a device can be rewarded to a user for using authentic replaceable resources (e.g., OEM-authentic resources). However, to bypass this restriction, inauthentic replaceable resources include forged elements (e.g., a falsified bar code). The forged elements cause resource interface 120 to extract a resource ID 132 that wrongly identifies the inauthentic resource as being authentic, and which causes the additional functionality to be wrongly provided.

An authentication component 140 can be provided to authenticate the replaceable resource 130. The authentication component 140 can correspond to any programmatic element or process which operates to independently authenticate an origin of the replaceable resource 130. For example, many network-enabled printers utilize an internal process or component to verify that an ink cartridge is from a particular origin. In examples of FIG. 1, the authentication component 140 can operate as either an independent functional component or as an integrated process provided by the controller 110. In either implementation, the authentication component 140 operates in a manner that is secured and tamper-proof. The authentication component 140 operates to authenticate the replaceable resource 130 by verifying the resource ID 132.

In one implementation, the authentication component 140 operates as a stand-alone or local element. For example, the authentication component 140 can include a reference library of codes which can be cross-referenced to the resource ID 132 in order to determine authenticity. The local reference library can be managed by the authentication component 140 and/or updated periodically. The reference library can also be stored in secure memory resources of the device 101 to be accessed at a later time.

In a variation, the authentication component 140 operates to trigger an authentication request (e.g., as part of authentication component result 142) with an authentication service 144. For example, the authentication component 140 can independently or as part of controller 110 trigger the network interface 160 to signal a secure communication to an authentication service 144 (for brevity shown to be in direct communication with the authentication component 140).

In one implementation, the authentication component 140 communicates with authentication service 144 to communicate data corresponding to the resource ID 132 for a resource 130 being authenticated. The communication of the resource ID 132 may be encrypted or otherwise secured. For example, a public/private key encryption process may be used in which the authentication component 140 encrypts the resource ID 132 using a public key that is shared with the authentication service 144. In turn, the authentication service 144 extracts the resource ID 132, and uses the code or data provided as part of the resource ID 132 to verify (or not verify) the replaceable resource as authentic. The authentication service 144 can provide a certificate 152 to the device 101 that signifies the authenticity of the replaceable resource 130. When the certificate 152 is provided, the authentication component 140 can securely store the certificate 152 in a certificate store 150, and replace or remove any prior certificates for a prior replaceable resource. The certificate store 150 can be implemented as a memory that is dedicated for storing various kinds of certificates, or alternatively, for certificates specifically associated with authentication service 144. Security measures (e.g., encryption) may be used to protect certificate storage 150 from tampering. Still further, the certificate store 150 can be controlled or managed with embedded machine readable instructions, such as embedded software or firmware.

In a variation, the certificate 152 is persistently and securely stored on the device 101 in the certificate store 150, and the authentication component 140 operates to enable or disable the certificate 152. When the replaceable resource 130 is authenticated, a secure return communication 155 from the authentication service 144 causes authentication component 140 to enable the certificate 152 on device 101. The presence or activation of certificate 152 provides indication that the replaceable resource 130 is authentic. If, however, the replaceable is deemed not authentic, then the device 101 does not receive the certificate 152, or alternatively cannot activate the stored certificate 152. As described below, the presence or activation of certificate 152 can serve as a condition for the device 101 to receive an auxiliary service or benefit, apart from the default (e.g., primary or core) services and functionality of the device 101.

Once the replaceable resource is authenticated, controller 110 can be enabled or activated to receive an enhanced set of services or functionality. According to one aspect, the controller 110 communicates with network service 170 to indicate that the replaceable resource 130 in use is authentic. In one implementation, the controller 110 accesses the certificate store 150 and communicates the certificate 152, or alternatively, data generated from the certificate to the network service 170. In another implementation, the controller 110 communicates data that is indicative of the presence of the certificate 152. Still further, the controller 110 may include functionality, or credentials which are unlocked or otherwise made available for use when certificate 152 is present. The functionality may include the ability to locate and/or access the network service 170 for additional auxiliary services.

In examples of the operation of authentication component 140, a customer purchases and installs toner cartridges with device 101. Authentication component 140 then contacts (e.g., pings) a cloud or web authentication service to determine if the installed toner cartridges are OEM authentic. If the installed cartridges are indeed authentic, a certificate is installed on device 101 stating the authenticity of the installed consumables. Furthermore, if a new consumable is later installed then device 101 contacts the cloud or web authentication service for authentication and renewal of the certificate. For example, a certificate for a color printer is tied to using all color toner cartridges from the original OEM. The certificate is authenticated and renewed each time a new color toner cartridge is installed.

According to an aspect, when the certificate 152 is present or active, the controller 110 can make a service request 164 that is proper. When the certificate is not present or active, the controller 110 may not be able to make the service request 164. Alternatively the service request 164 may not be proper as the service request was not communicated with other data indicating the presence of a valid or active certificate 152. The proper service request 164 can include an identifier for the device 101.

In some variations, the request 164 can be provided with device or resource information 166. The device or resource information 166 can include any information about the device or resource which the service 170 can utilize in providing auxiliary or enhanced services or functionality. In implementations, device/resource information 166 includes information about the device 101 (e.g., type of device, usage information about the device, such as heavy or light usage) and/or information about the resource 130 (e.g., when resource 130 was first installed).

The device interface 172 of service 170 can process the service request 164, and determine information such as whether the request 164 is proper. In one implementation, the device interface 172 determines whether the certificate 152 communicated from the device 101 is valid. The device interface 172 can also determine the identifier 103 of the device 101 making the request.

The identifier 103 of the device 101 can be communicated to the service engine 174. In one implementation, the service engine 174 can respond to the proper service request 164 by selecting a service or other functionality for the device 101. The selection can be based on, for example, (i) time of request (e.g., all devices that make a proper request receive a same service in a given time period); (ii) type of device, which can be determined from the device identifier 103; and/or (iii) the specific device making the request. In the latter case, the device interface references the device identifier 103 with an account store 175 in order to determine a profile of the device or the user. The profile can include, for example, information provided by the user (e.g., user can access a website for the network service 170 to complete a form), services that the user has previously received, or historical resource or service related information (e.g., number of times the user has used replaceable resources 130 from a desired source). As an addition or alternative, the service engine 174 can use the device information 166 to select or configure a service for the device 101.

Examples of auxiliary services provided include 1) new services on the device (e.g., printing services; gaming services; device control services), 2) network services (e.g., e-mail, messaging, Internet functions), 3) modification of existing services (e.g., modifying how a default printing function works) or 4) premium services. The auxiliary services which are provided may include any combination of these kinds of services.

In implementations, the same auxiliary service or additional functionality may be provided in response to different conditions. For example, an auxiliary service is provided for a printer as part of a cloud printing service. The cloud printing service provides the auxiliary service as a bonus to users who use authentic, OEM-certified resources with their printer, and also provides the auxiliary service to users who pay a fee for access to the service even if they do not use authentic resources with their printer. Users who do use authentic resources are provided a certificate (e.g., a certificate 150 stored on the user's printer) which enables the user to access and use the auxiliary service on their printer free of charge as long as the certificate is valid.

In another implementation, a cloud printing service ties the use of the auxiliary service to a quota. For example, if the user uses the auxiliary service enough times to meet a monthly quota, the customer may receive an exemption from being charged the next month for use of the auxiliary service. However, if the customer does not meet the monthly quota, the customer is charged the next month. In further examples, a schedule can be put into place to vary a charge for the auxiliary services based on use.

According to another aspect, controller 110 receives logic, in the form of a code (e.g., script) as service item 177. The controller 110 uses the logic to provide a notification to the user that the auxiliary services or additional functionality are being provided on device 101. In this way, the controller 110 can utilize the service item 177 (e.g., logic) to provide, unlock or enable (e.g., through download) the services or additional functionality which is linked to the notification. The additional functionality may originate from the service 170, or may leverage existing functionality present on device 101. While FIG. 1 refers to service item 177 in the singular for brevity, examples provide for the use of multiple service items 177.

As additional or alternative examples, the service item 177 can include A) tokens (e.g., persistent or session-based stored items which enable additional functionality while present), B) links (e.g., a link through which controller 110 accesses additional functionality), or C) code or script logic for establishing a socket or other bi-directional data channel. In some examples, service item 177 includes programming which, when executed by controller 110, establishes a bi-directional data channel between device 101 and service engine 174 on a session-by-session basis. In further examples, service item 177 includes a token; the token is received and stored, and the presence of the token permits controller 110 to execute additional functionality.

In examples of the notification, controller 110 executes the code or programming that is received as or with service item 177 to alter a user interface on UI/output 190 to reflect the new auxiliary services or functionality. For example, UI content 192, reflecting standard or default operation of device 101, and UI update 194 (e.g., a notification corresponding to the auxiliary services) are provided as part of UI/output 190. A user may interact (user interaction 196) with UI/output 190, e.g., via mouse, touch-sensitive pad, text input, etc., with the new UI update 194.

In implementations, UI update 194 includes a user notification which notifies the user about how the auxiliary services are being made available. For example, the service corresponds to a cloud printing service, and the device corresponds to a printer. The cloud printing service receives a service request from the printer which states that the printer is using an authentic ink resource from a desired source. The cloud printing service enables auxiliary services on the printer (e.g., instant printing; ink subscription). The printer then displays a notification to a user that the auxiliary services are now available due to the authentic ink resource. The user then utilizes the auxiliary services.

In examples of the notification, a pop-up icon is provided as part of UI update 194 notifying the user that an additional service is available for selection. In other examples new text content (e.g., header) may be provided on UI/output 190 to show the user that an auxiliary service has been enabled. In further examples a notification may be provided on UI/output 190 which includes features (e.g., a selectable hyperlink) to enable a user to perform further actions.

In additional examples of the notification, during an installation process an authentication component 140 operates to activate or install an authentication certificate. In response to the activation or presence of the certificate, controller 110 activates processes to modify a user interface layout (e.g., UI/output 190). The user interface layout can be modified to have additional solutions/services for the user, and the solutions/services can be provided in addition to the default services on the computing device.

In an implementation, some or all of the additional auxiliary services to be provided on device 101 (or logic to provide such additional functionality or logic) are already present on the device, but such functionality remains in a locked state. The controller 110 can use the service item 177 (e.g., which can be provided as a token or link) to unlock and activate the auxiliary functionality. After receiving any certificate information (e.g., data indicative of the presence of certificate 152), the service item 177 can provide the controller 110 with a token to unlock the functionality and/or a link to locally identify and access the functionality.

In another implementation, the additional auxiliary services to be provided on device 101 are not already present on device 101. The service item 177 enables controller 110 to obtain the needed auxiliary services. For example, the service item 177 can include an encoded link from which the device 101 can access the auxiliary services.

According to one aspect, when the device 101 is enabled or has access to the auxiliary services or functionality, the memory can store instructions 184 for enabling the auxiliary service or functionality. For example, memory 180 can store instructions for auxiliary services 184, as well as instructions 182 for basic or default services. The controller 110 executes the instructions for auxiliary services 184 to provide additional functionality, as described above regarding service engine 174. For example, if device 101 is a printer, instructions for auxiliary services 184 may include instructions for a premium printing package (e.g., printing complex graphical designs, special effects, etc.).

In implementations, controller 110 operates between at least two levels of function, a basic level and an enhanced level. At the basic level controller 110 implements the instructions for basic services 182 while precluding implementation of instructions for auxiliary services 184. At the enhanced level, controller 110 implements both the instructions for basic services 182 and the instructions for auxiliary services 184. While FIG. 1 illustrates the storage of instructions for auxiliary services 184 in memory 180 of device 101, as described above other auxiliary services may be provided which do not involve stored instructions.

Examples provide for elements illustrated in FIG. 1 to be implemented by use of hardware in conjunction with downloadable machine readable instructions. For example, elements of FIG. 1 may be implemented by hardware in conjunction with a downloadable software application (app) on a computing device. In examples, elements of device 101 may be implemented as an application operating on a portable computing device. In such examples authentication component 140 may form a secure handshake (e.g. TLS/SSL handshake) with authentication server 144, confirm that communication is possible, and send info securely once the handshake occurs. Sending information securely may be part of the communication between authentication component 140 and authentication service 144 (e.g., authenticity component result 142).

In examples, authentication service 144 may determine that the replaceable resource 130 is not valid. For example, replaceable resource 130 may not be OEM authentic; replaceable resource 130 may have a source which is not approved; or a subscription associated with device 101 may have expired. If authentication service 144 determines the replaceable resource 130 is not valid, for example, then the authentication component 140 is unable to replace or update the certification 152. Without access to the certification 152, the controller 110 may lack access for providing additional services and functionality, so that additional services other than the basic or default services or functionality are suppressed or otherwise precluded. Furthermore controller 110 prevents further reactivation of the auxiliary service or functionality. For example, component 140 may remove or disable a certificate (if any such certificate exists) associated with the consumable resource 130.

Figure 2:
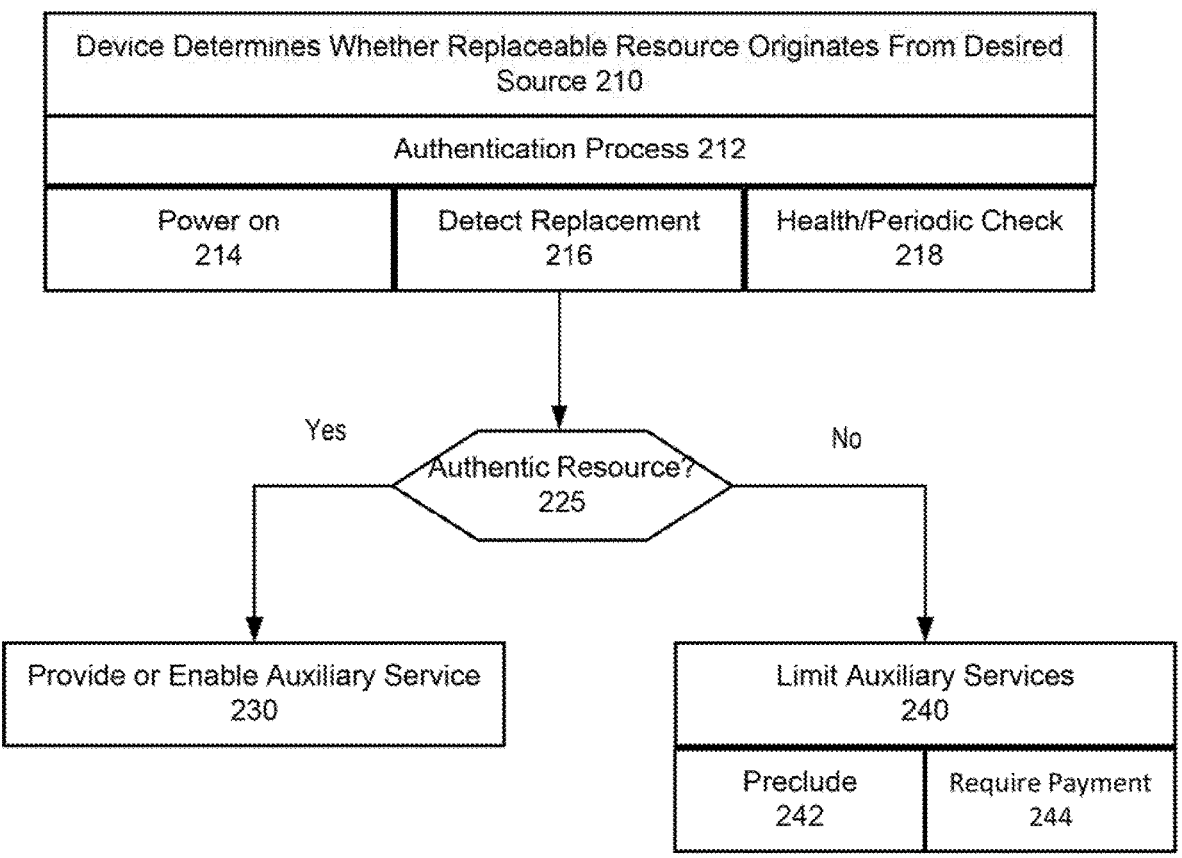
FIG. 2 illustrates an example method for changing an operational level of a device.
Figure 3:
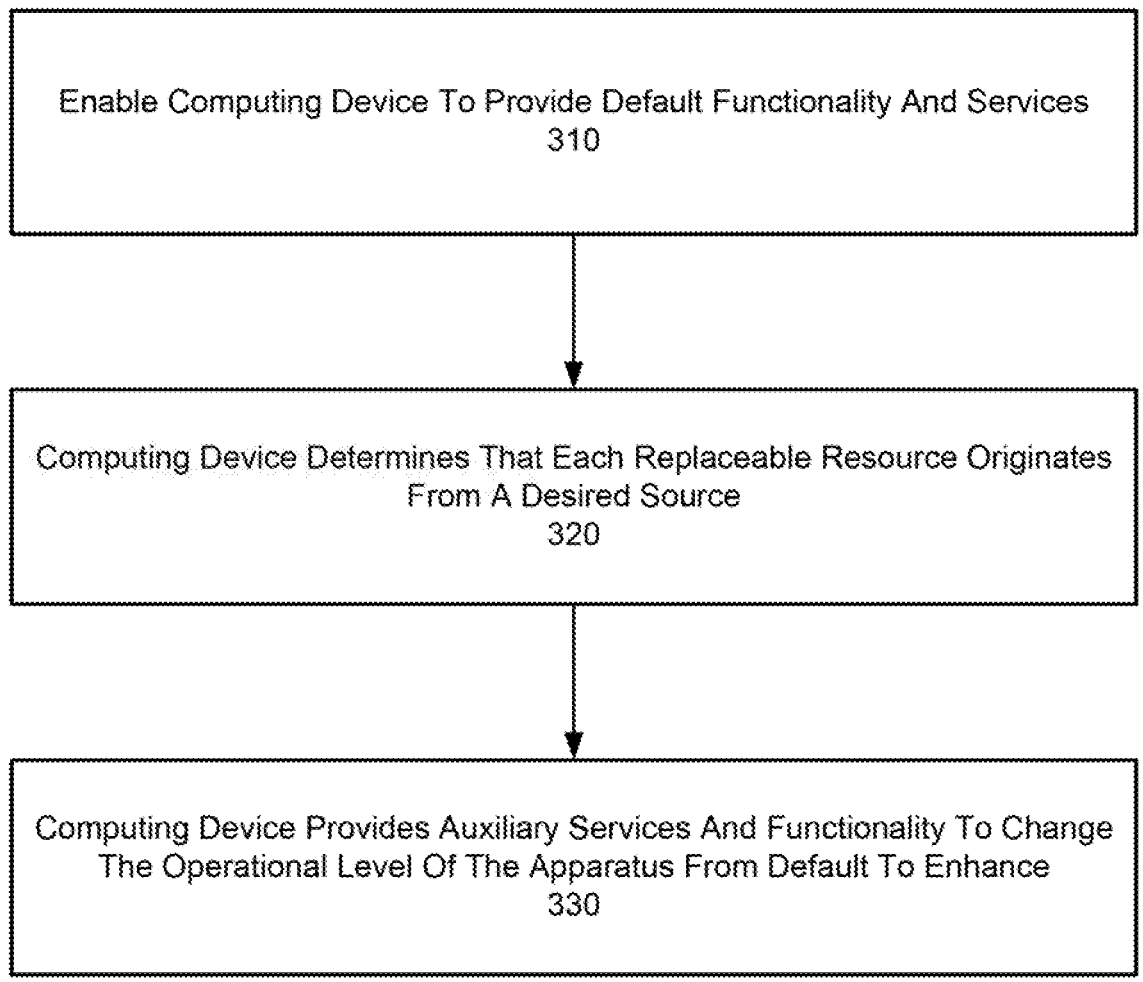
FIG. 3 illustrates an example method for verifying the source of a consumable resource to enable auxiliary services.
Figure 4:
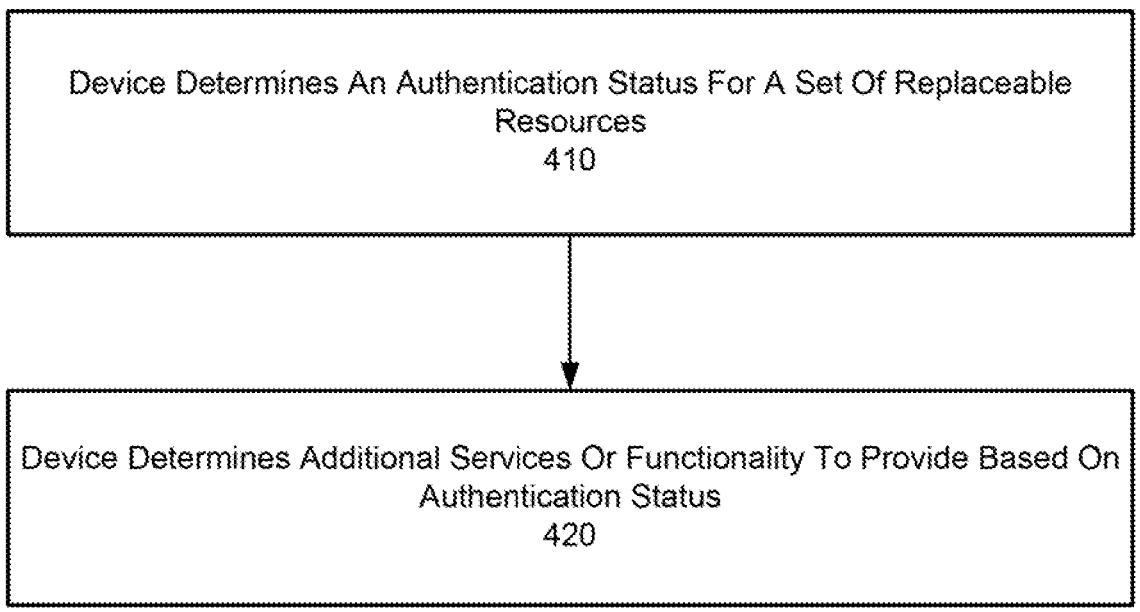
FIG. 4 illustrates an example method for determining services or functionality to provide to a computing device based on an authentication status of a set of replaceable resources.

Optionally, a notification may be provided on UI/output 190 that the consumable resource 130 is not authentic and that the auxiliary services are being suppressed/disabled, and informational content such as why the consumable resource 130 was not authentic. The notification may further include other content, such as a selectable link to enable a user to pay for enabling the auxiliary services, or to buy better consumable resources, FIG. 2 illustrates an example method for changing an operational level of a device. FIG. 3 illustrates an example method for verifying the source of a consumable resource to enable auxiliary services. FIG. 4 illustrates an example method for determining services or functionality to provide to a computing device based on an authentication status of a set of replaceable resources. An example method such as described by FIG. 2, FIG. 3 or FIG. 4 can be implemented using components such as described with an example system of FIG. 1. Accordingly, reference may be made to elements of FIG. 1 for purpose of illustrating suitable elements or components for performing a step or sub-step being described.

With reference to FIG. 2, a device performs operations to determine whether a replaceable resource originates from a desired source (210). For example, the device 101 performs operations to determine whether each replaceable resource in a set of replaceable resources originates from a desired source. The determination can include an authentication process, such as described with an authentication component 140, to determine that a replaceable resource 130 is authentic. The authentication process can be performed in response to a variety of events, such as, for example, the device being powered on (214), the device detecting the presence of a newly placed replaceable resource (e.g., as a replacement for an existing resource) (216), and/or a health/periodic check of the resource (218).

In an aspect, a determination is made as a result of performing the authentication process as to whether replaceable resource originates from a desired source (225). If the determination of, for example, the authentication component 140 is that the replaceable resource 130 originates from the desired source, then device provides or enables auxiliary services (230). However, if the determination is that the resource does not originate from the desired source, then the device limits the auxiliary services (240). For example, the device may preclude the auxiliary services from being implemented (242).

As an addition or alternative, the device 101 may require payment for the auxiliary services that were otherwise available through the use of authentic replaceable resources (244). By way of example, the user can be prompted for a single-use fee, a recurring charge, or a premium user account which a user pays for and in return receives access to the auxiliary services. In an example, the auxiliary service is provided as a bonus while an authentic resource is being used, and is also provided to users who pay a fee for access to the auxiliary service. While the user may be prompted for payment to receive the auxiliary services in lieu of using replaceable resources 130 from a desired source, basic services are not affected or tied to additional payment or limitations on the source of replaceable resources.

With reference to FIG. 3, an apparatus is enabled to operate, by default, to provide a core/primary function (310). In an example, the apparatus operates at a functional operational level that excludes any service or functionality other than a default set of services or functionality. For example, with reference to FIG. 1, controller 110 is unable to access or provide auxiliary services. In a variation, the controller 110 suppresses auxiliary services from being provided on the device 101, while at the same time providing a core set of primary functionality.

The apparatus then performs operations to determine whether each replaceable resource in a set of replaceable resources originates from a desired source (320). For example, the authentication component 140 can determine when the replaceable resources are authentic and originate from a desired source.

In response to determining that each replaceable resource in the set of replaceable resources originates from the desired source (320), at least a first auxiliary resource or functionality is provided so as to change the operational level of the apparatus from the default operational level to an enhanced operational level (330). By way of reference to FIG. 1, controller 110 implements added functionality via service 170, which changes the operational level of functionality for device 101.

With reference to an example of FIG. 4, a computing device determines an authentication status for one or more of a set of replaceable resources (410). The authentication status indicates whether any of the replaceable resources originate from a desired source (e.g., the OEM). According to one aspect, if more than one replaceable resource is used at one time, the determined authentication status can reflect the status of the group, meaning each and every replaceable resource in use would need to originate from the desired source for the status to satisfy the requirement for receiving additional services or functionality.

The device can then receive additional services or functionality based on the authentication status for the replaceable resources (420). For example, the controller 110 or the network service 170 can include logic for determining a set of auxiliary services or functionality to provide to the computing device based on the authentication status of each replaceable resource in the set. The set of services or functionality can additive to a default set of services or functionality for enabling a functional operational level on the computing device (420). For example, controller 110 of a device 101 may communicate with a service 170, to receive service item 177 which determines auxiliary services to be provided on the device.

Figure 5:
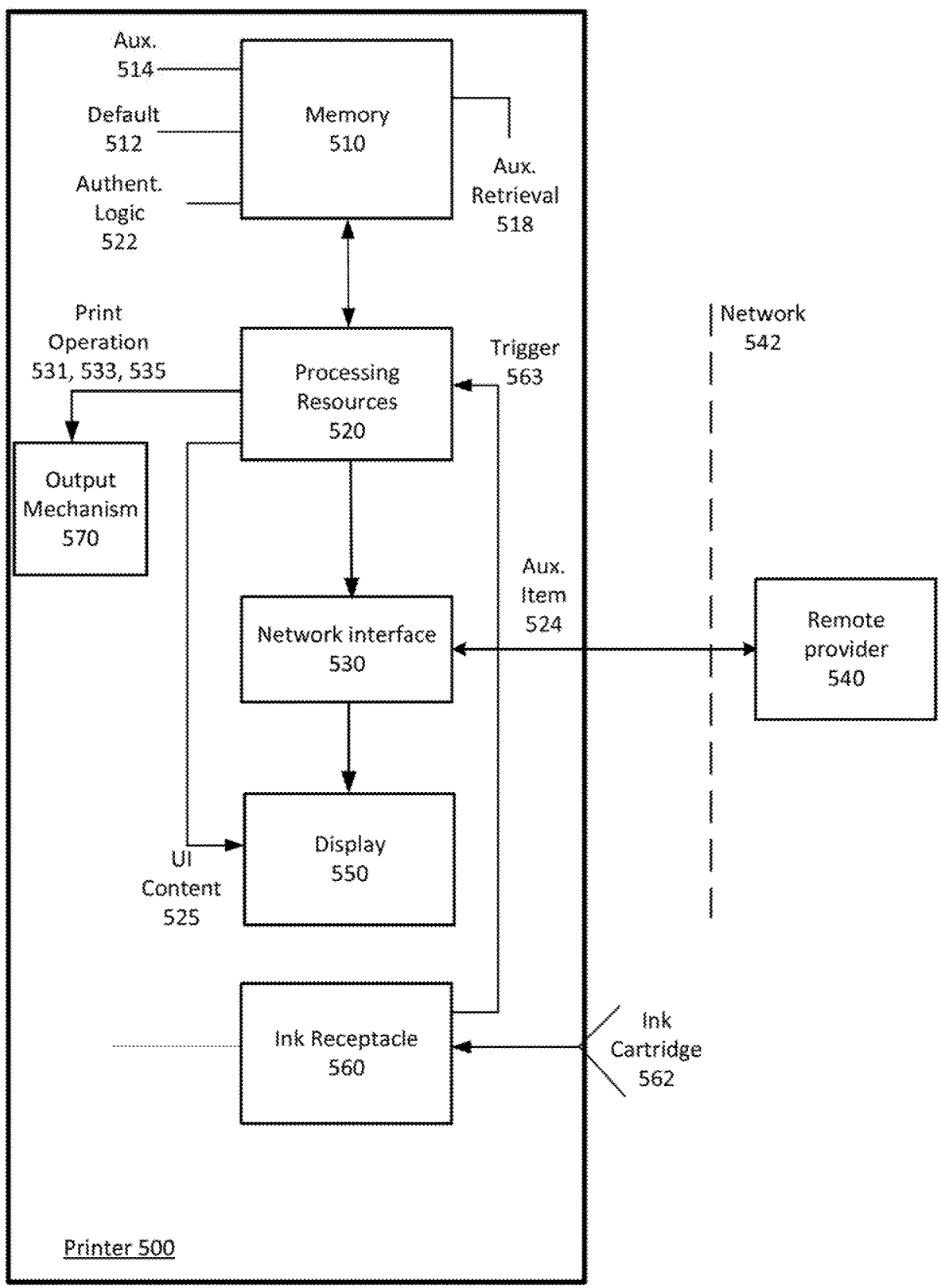
FIG. 5 illustrates an example of a network-enabled printer, according to an aspect.

FIG. 5 illustrates an example of a network-enabled printer. The printer 500 includes a memory 510, processing resources 520, a network resource 530, a display 540 and an output mechanism 570. The printer 500 also includes an ink receptacle 560 which receives ink cartridges 562. The ink cartridges 562 provide an example of a replaceable resource, as the ink cartridges are consumed over time and then replaced.

The memory 510 can store instructions for operating the printer 500. The instructions can include default instructions 512, which can be executed by the processing resources 520 to enable default or core functionality from the printer 500. The default instructions 512 can, for example, enable the processing resources 520 to initiate print operations 531 through the output mechanism 570. Additionally, the default instructions 512 can generate user interface content 525 for the display 550. In some variations, the instructions can provide, as part of the user interface content 525, a notification for the display 550 that indicates that auxiliary services are (or are not) provided.

According to one aspect, the ink receptacle 560 is coupled to or provides logic for detecting insertion of ink cartridges 562. When inserted, a trigger 563 can be signaled to the processing resources 520. Depending on implementation, the ink receptacle 560 determines identification information 563 for the ink cartridge(s) that are inserted for use with the printer 500. The cartridge identification information 563 is signaled to the processing resources 520, which in turn implements the authentication logic 522.

In one implementation, the authentication logic 522 is executed to trigger authentication with a remote service (not shown). When authenticated, the processor can execute the auxiliary retrieval instructions 518 to request and retrieve an auxiliary item 524 from a remote provider 540. The request can be communicated over a network 542. In response to the request, the printer 500 can receive an auxiliary item 524. The processor can use the auxiliary item 524 to retrieve and/or store auxiliary instructions 514. For example, the auxiliary item 524 can correspond to a script, a link, a token or other data item from which additional functionality and services can be determined. The processing resources 520 can execute the auxiliary instructions 514 in order to, for example, enable (i) enhanced print operations 533 (e.g., special effects), or (ii) print operations for special or subscribed content 535. As an addition or alternative, the processing resource can modify the user interface content 525 to include additional features as provided by the auxiliary services.

Although illustrative examples have been described in detail herein with reference to the accompanying drawings, variations to specific examples and details are encompassed by this disclosure. It is intended that the scope of the invention is defined by the following claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

What is claimed is:

1. An apparatus comprising:
   a memory resource;
   controller;
   a resource utilization component to manage use of a set of replaceable resources;
   wherein the controller is to:
   determine whether each replaceable resource in a set of replaceable resources originates from a desired source;
   provide an auxiliary service or functionality on the apparatus when each of the set of replaceable resources originates from the desired source, and preclude use of the auxiliary service or functionality when any of the set of replaceable resources is not determined to originate from the desired source, wherein at least a first replaceable resource in the set of replaceable resources is subject to an authentication process that identifies a certificate for the at least first replaceable resource, and wherein the controller is to determine that the first replaceable resource originates from the desired source by determining whether the certificate is stored in the memory resource of the apparatus.

2. The apparatus of claim 1, wherein the controller to:
   determine whether each replaceable resource in the set of replaceable resources originates from the desired source by obtaining an identifier of each replaceable resource in the set of replaceable resources, and
   for each replaceable resource, use the respective identifier to verify that the source of the replaceable resource is the desired source.

3. The apparatus of claim 2, further comprising a network interface, and wherein the controller is to:
   use the identifier of the replaceable resource to communicate, using the network interface, with a third party verification service for the replaceable resource.

4. The apparatus of claim 1, further comprising:
   a network interface; and
   wherein the controller is to:
   enable the auxiliary service or functionality by accessing a network service using the network interface.

5. The apparatus of claim 1, wherein the controller is to alter a graphical user interface on the apparatus as part of enabling the auxiliary service or functionality.

6. The apparatus of claim 1, wherein the set of replaceable resources are a set of ink resources, and wherein the controller is to determine whether each replaceable resource in a set of replaceable resources originates from a desired source by:
   determining the source of individual ink resources in the set of ink resources.

7. The apparatus of claim 1, further comprising an authentication resource resident with the apparatus, the authentication resource to implement the authentication process to obtain the certificate from a remote authority.

8. The apparatus of claim 7, wherein the authentication resource is to determine that the first replaceable resource originates from the desired source by determining that the first replaceable resource is original equipment manufacturer (OEM) authentic.

9. A method for providing a service to an apparatus, the method comprising:
   enabling the apparatus to operate, by default, at a functional operational level that excludes any service or functionality other than a default set of services or functionality;
   performing one or more operations to determine whether each replaceable resource in a set of replaceable resources originates from a desired source, wherein a first replaceable resource in the set of replaceable resources is subject to an authentication process that identifies a certificate for the first replaceable resource, and wherein performing one or more operations to determine whether each replaceable resource in the set of replaceable resources originates from a desired source includes determining whether the certificate is stored in a memory resource of the apparatus;

in response to determining that each replaceable resource in the set of replaceable resources originates from the desired source, providing at least a first auxiliary resource or functionality to the apparatus so as to change the operational level of the apparatus from the default operational level to an enhanced operational level.

10. The method of claim 9, wherein the apparatus provides at least one default service while operating in the default operational level, and wherein the auxiliary resource or functionality includes an auxiliary service.

11. A non-transitory computer readable medium storing instructions, that when executed by one or more processors, cause the one or more processors to:

determine an authentication status for a set of replaceable resources of a computing device, the authentication status indicating whether each replaceable resource in the set of replaceable resources originates from a desired source, wherein each replaceable resource in the set of replaceable resources is subject to an authentication process that identifies a certificate for each replaceable resource, and wherein the instructions to determine the authentication status for the set of replaceable resources comprise instructions to determine whether each replaceable resource in the set of replaceable resources originates from a desired source according to whether the certificate is stored in a memory resource of the computing device; and determine a set of auxiliary services or functionality to provide to the computing device based on the authentication status of each replaceable resource in the set of replaceable resources, the set of auxiliary services or functionality being in addition to a default set of services or functionality for enabling a functional operational level on the computing device.

12. The non-transitory computer readable medium of claim 11, wherein determining the set of auxiliary services or functionality includes providing at least one item to the computing device, the item selected from a group of: a token, link, code, or script logic.

13. The non-transitory computer readable medium of claim 12, wherein the at least one item, when provided to the computing device, enables the set of auxiliary services or functionality to be provided on the computing device.

* * * * *